United States Patent
Jhun et al.

(10) Patent No.: US 12,406,810 B2
(45) Date of Patent: Sep. 2, 2025

(54) CERAMIC ELECTRONIC COMPONENT HAVING EXTERNAL ELECTRODE WHICH INCLUDES BORON WITH HIGH RATIO OF ISOTOPE 10B

(71) Applicant: SAMSUNG ELECTRO-MECHANICS CO., LTD., Suwon-si (KR)

(72) Inventors: Jeong Pil Jhun, Suwon-si (KR); Soo Hwan Son, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 234 days.

(21) Appl. No.: 18/200,971

(22) Filed: May 23, 2023

(65) Prior Publication Data
US 2024/0203659 A1 Jun. 20, 2024

(30) Foreign Application Priority Data
Dec. 9, 2022 (KR) .................. 10-2022-0171355

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/224* | (2006.01) |

(52) U.S. Cl.
CPC .............. *H01G 4/30* (2013.01); *H01G 4/008* (2013.01); *H01G 4/012* (2013.01); *H01G 4/12* (2013.01); *H01G 4/224* (2013.01)

(58) Field of Classification Search
CPC .......... H01G 4/30; H01G 4/008; H01G 4/012; H01G 4/12; H01G 4/224; H01G 4/232; H01G 4/2325; H01G 4/005; H01G 4/1227
See application file for complete search history.

(56) References Cited

U.S. PATENT DOCUMENTS

| | | | |
|---|---|---|---|
| 2008/0123248 A1* | 5/2008 | Kunishi | ............... C25D 5/02 |
| | | | 361/306.3 |
| 2012/0039015 A1* | 2/2012 | Saruban | ............... H01G 4/005 |
| | | | 361/301.4 |

(Continued)

FOREIGN PATENT DOCUMENTS

| | | |
|---|---|---|
| KR | 10-2014-0087282 A | 7/2014 |
| KR | 10-2015-0128309 A | 11/2015 |

OTHER PUBLICATIONS

"Neutron Scattering Lengths and cross sections," Neutron News, vol. 3, No. 3, 1992, pp. 29-37 (https://www.ncnr.nist.gov/resources/n lengths/elements/b.html).

(Continued)

*Primary Examiner* — Timothy J. Dole
*Assistant Examiner* — Daniel M Dubuisson
(74) *Attorney, Agent, or Firm* — Morgan Lewis & Bockius LLP

(57) ABSTRACT

A ceramic electronic component including: a body including a dielectric layer and internal electrodes; and external electrode disposed on the body and including boron, wherein a ratio of isotope $^{10}B$ in boron is 20% or more. In some example embodiments, boron is included in the form of boric oxide ($B_2O_3$).

16 Claims, 7 Drawing Sheets

(56) References Cited

U.S. PATENT DOCUMENTS

| | | | | |
|---|---|---|---|---|
| 2014/0116766 | A1* | 5/2014 | Jeon | H05K 3/3442 |
| | | | | 361/321.2 |
| 2014/0290999 | A1* | 10/2014 | Park | H01G 4/30 |
| | | | | 29/25.03 |
| 2015/0279570 | A1* | 10/2015 | Koga | H01G 4/248 |
| | | | | 29/25.42 |
| 2015/0318111 | A1* | 11/2015 | Lee | H01G 4/2325 |
| | | | | 29/25.03 |
| 2016/0172108 | A1* | 6/2016 | Ikeda | H01G 4/2325 |
| | | | | 361/301.4 |
| 2016/0276104 | A1* | 9/2016 | Nishisaka | H01G 4/2325 |
| 2018/0068795 | A1* | 3/2018 | Park | H01G 4/2325 |
| 2019/0252120 | A1* | 8/2019 | Sakate | B32B 37/10 |

OTHER PUBLICATIONS

H. Schmitt, et al., "Total neutron cross section of B10 in the thermal neutron energy range," Nuclear Physics, vol. 17, 1960, pp. 109-115 (https://www.sciencedirect.com/science/article/abs/pii/002955826090105X).

"Never Another Chernobyl: Boron in Nuclear Energy Helps Ensure Safety," posted Jun. 24, 2019, U.S. Borax https://www.borax.com/news events/Jun. 2019/never another chernobyl boron in nuclear energy.

"Neutron Interaction," Engineer Jan. 2019, https://tnwjdyd.tistory.com/8 (with English machine translation).

C. Park, "Reaction Area," Atomic Wiki, Reaction Cross Section (with English machine translation), https://atomic.snu.ac.kr/index.php/%EB%B0%9 8%EC%9D%91%EB%8B %A8%EB%A9%B4%EC%A0%81 (retrived Mar. 9, 2023).

"Boron," Atomic Wiki, Mar. 9, 2023 (with English translation), (https://atomic.snu.ac.kr/index.php/%EB%B6%95%EC%86%8C).

Blog and its English machine translation Dec. 2022, (blog.naver.com/karipr/222808320202)blog.naver.com/karipr/222808320202).

"Neutron scattering lengths and cross sections," Oct. 13, 2021, https://www.ncnr.nist.gov/resources/n lengths.

S. Thibeault, "Radiation Shielding Materials Containing Hydrogen, Boron, and Nitrogen: Systematic Computational an Experimental Study," NASA Langley Research Center, Feb. 17, 2014.

\* cited by examiner

CERAMIC ELECTRONIC COMPONENT HAVING EXTERNAL ELECTRODE WHICH INCLUDES BORON WITH HIGH RATIO OF ISOTOPE 10B

CROSS-REFERENCE TO RELATED APPLICATION(S)

This application claims benefit of priority to Korean Patent Application No. 10-2022-0171355 filed on Dec. 9, 2022 in the Korean Intellectual Property Office, the present disclosure of which is incorporated herein by reference in its entirety.

BACKGROUND

1. Technical Field

The present disclosure relates to a ceramic electronic component.

2. Description of Related Art

A multi-layered ceramic capacitor (MLCC), one of ceramic electronic components, may be a chip-type condenser which is mounted on a printed circuit board of various electronic products, such as an imaging device such as a liquid crystal display (LCD) or a plasma display panel (PDP), a computer, a smartphone or a mobile phone, to charge or discharge electricity therein or therefrom.

The MLCC may be used as a component of various electronic apparatuses because the MLCC is small, has high capacitance, and is easily mounted. In addition, a MLCC product may be used in a special environment. For example, the MLCC may be used in an electronic component used near a nuclear fuel in a nuclear power plant, or used in a space shuttle, an artificial satellite or the like, under an influence of galactic cosmic radiation.

In recent years, interest in space has been increasing, and a growing number of electronic devices using special materials or designs to ensure normal operation even within space environment is being researched and mounted in a space launch vehicle.

Accordingly, there is a need for research and development on the electronic device that may minimize the influence of cosmic radiation, and also a need for research and development on the multi-layered ceramic capacitor which may minimize the influence of cosmic radiation.

SUMMARY

An aspect of the present disclosure may provide a ceramic electronic component which may minimize an influence of cosmic radiation.

However, the present disclosure is not limited to the description above, and may be more readily understood in the description of exemplary embodiments of the present disclosure.

According to an aspect of the present disclosure, a ceramic electronic component may include: a body including a dielectric layer and internal electrodes; and external electrodes each positioned on the body and including boron, wherein a ratio of isotope $^{10}B$ in the boron is 20% or more.

According to another aspect of the present disclosure, a ceramic electronic component may include: a body including a dielectric layer and internal electrodes; and external electrodes each positioned on the body and including boron, wherein a ratio of isotope $^{10}B$ in boron is 25% or more and 85% or less.

DETAILED DESCRIPTION

Figure 1:
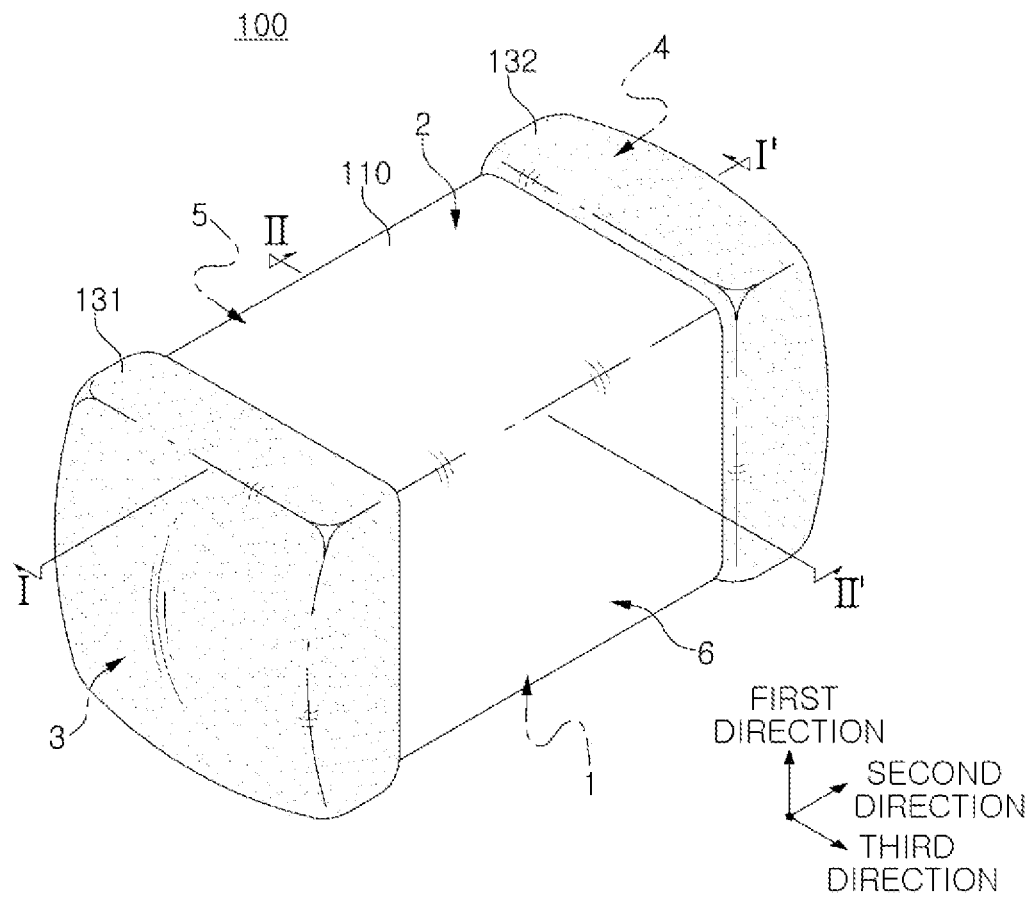
FIG. 1 is a perspective view schematically showing a ceramic electronic component according to an exemplary embodiment of the present disclosure.

Hereinafter, exemplary embodiments of the present disclosure will now be described in detail with reference to the accompanying drawings.

In the drawings, a first direction may indicate a stack direction or a thickness (T) direction, a second direction may indicate a length (L) direction, and a third direction may indicate a width (W) direction.

Ceramic Electronic Component

FIG. 1 is a perspective view schematically showing a ceramic electronic component according to an exemplary embodiment of the present disclosure.

Figure 2:
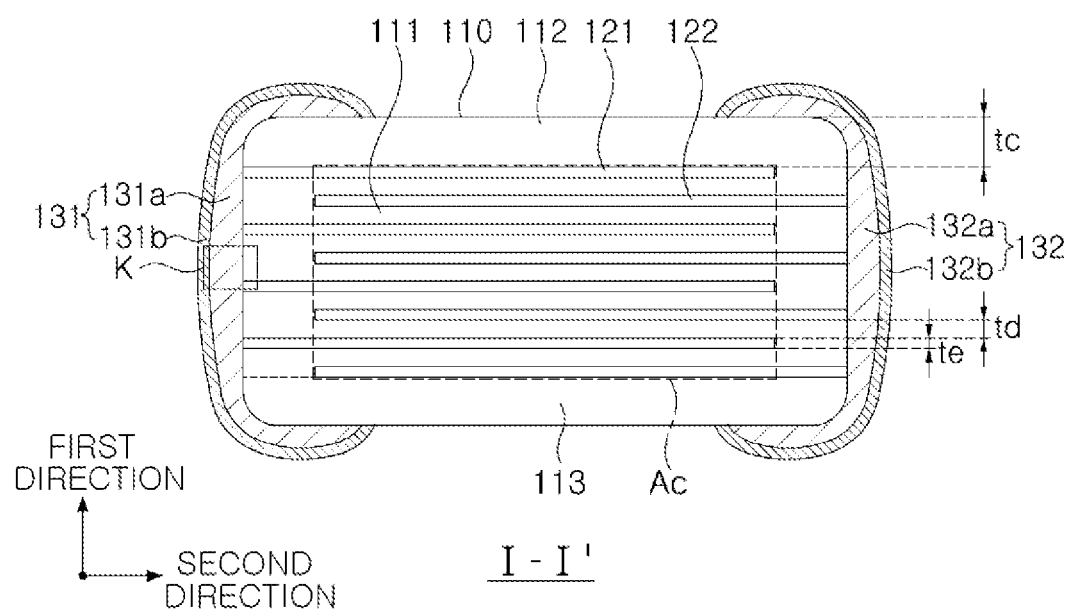
FIG. 2 is a schematic cross-sectional view taken along line I-I' in FIG. 1.

FIG. 2 is a schematic cross-sectional view taken along line I-I' of FIG. 1.

Figure 3:
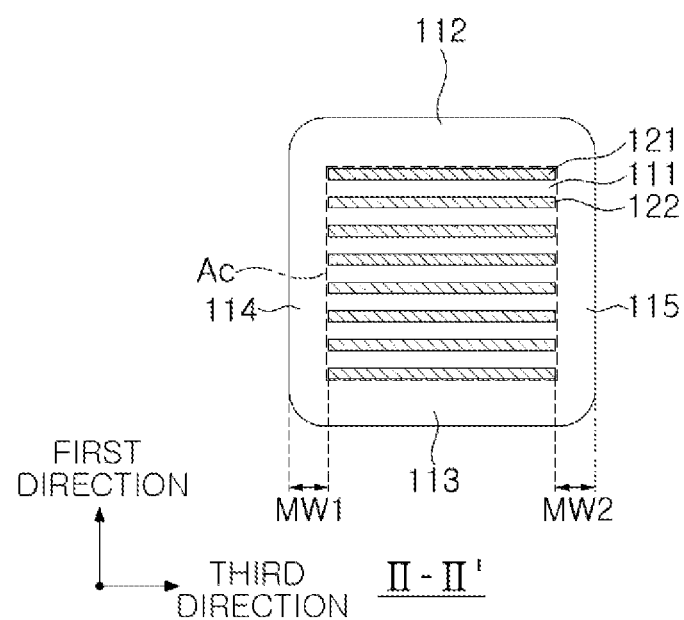
FIG. 3 is a schematic cross-sectional view taken along line II-II' in FIG. 1.

FIG. 3 is a schematic cross-sectional view taken along line II-II' of FIG. 1.

Figure 4:
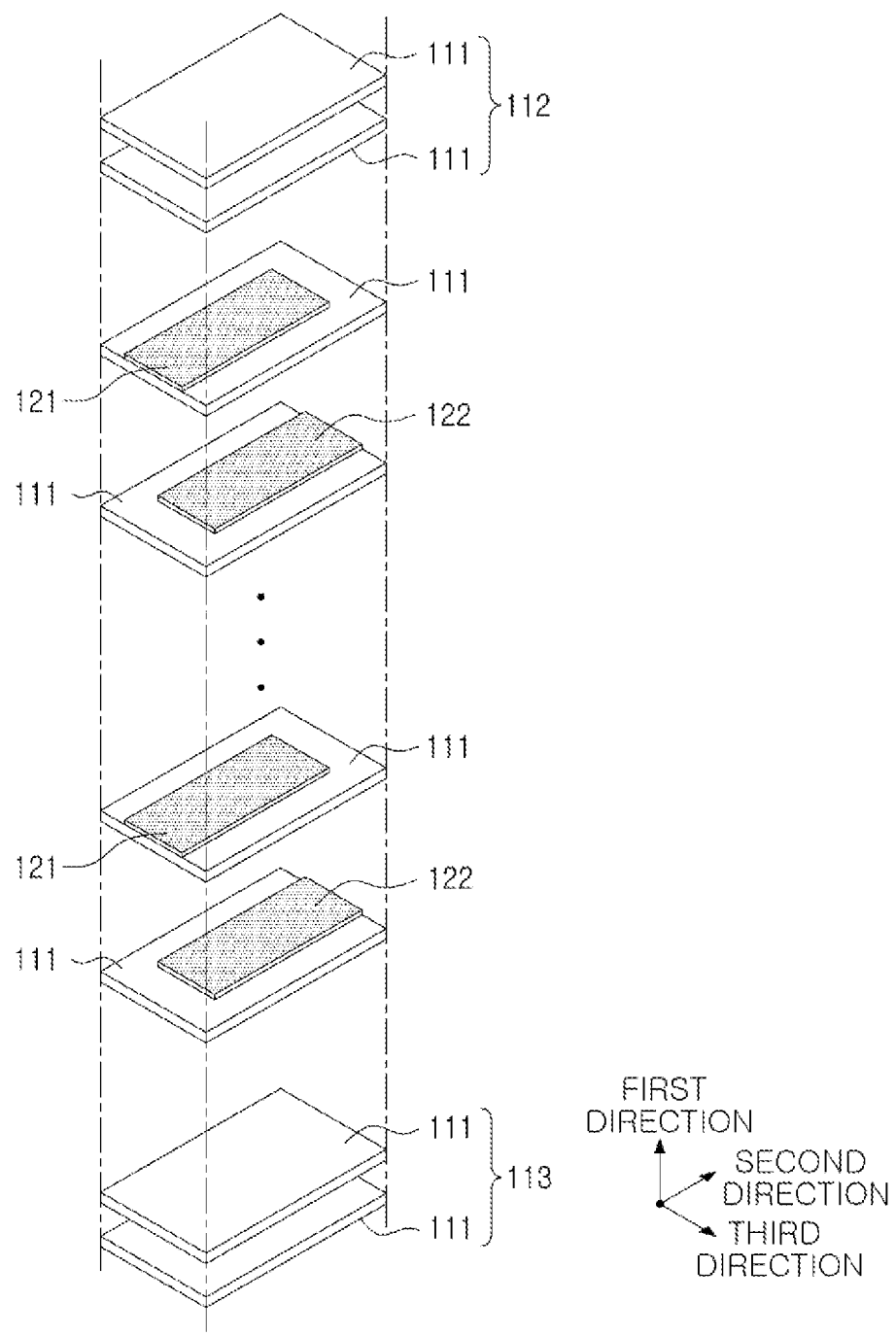
FIG. 4 is a view schematically showing a disassembled body.

FIG. 4 is a view schematically showing a disassembled body.

Figure 5:
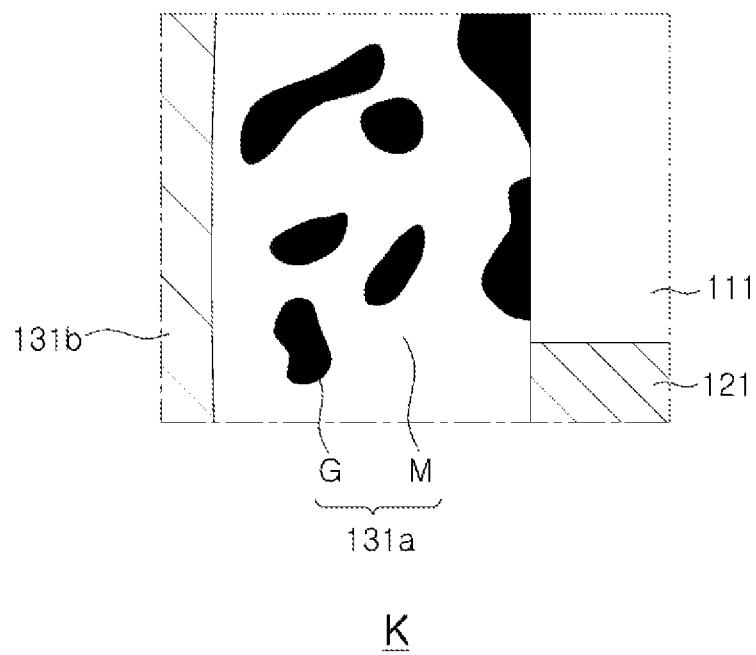
FIG. 5 is an enlarged view of a region K in FIG. 2.

FIG. 5 is an enlarged view of a region K.

Hereinafter, a ceramic electronic component 100 according to an exemplary embodiment of the present disclosure is described with reference to FIGS. 1 through 5. In addition, a multi-layered ceramic capacitor (hereinafter, referred to as 'MLCC') is described as an example of a ceramic electronic component, the present disclosure is not limited thereto, and may also be applied to various ceramic electronic components using ceramic materials, such as an inductor, a piezoelectric element, a varistor, and a thermistor.

The ceramic electronic component 100 according to an exemplary embodiment of the present disclosure may include: a body 110 including a dielectric layer 111 and internal electrodes 121 and 122; and external electrode 131 and 132 disposed on the body and including boron, wherein a ratio of isotope $^{10}B$ in boron is 20% or more.

The ceramic electronic component 100 uses a ceramic as a main material, and is generally known to have excellent durability against radiation. However, the following is reported: the ceramic electronic component has a damaged characteristic due to its crystallinity changed to amorphous by radiation of heavy ions (e.g., Ag 7+ ions) having high energy, noise caused by radiation induced current (RIC) occurring by other low-energy ionizing radiation, or lower capacitance. Neutron radiation is also one of the ionizing radiations, and may exist near a nuclear fuel in a nuclear power plant or inside space and an artificial satellite. In addition, the neutron radiation may also occur by an action of galactic cosmic radiation (GCR) and solar energetic particles (SEP).

According to an exemplary embodiment of the present disclosure, the external electrode may include boron, and the ratio of isotope $^{10}B$ in boron may be 20% or more, thereby increasing durability of the ceramic electronic component against the neutron radiation. In addition, when mounted on an integrated circuit board, the ceramic electronic component may protect a surrounding electronic device from the neutron radiation. As used herein, the ratio of isotope $^{10}B$ (or $^{11}B$) in boron may refer to the ratio of the number of moles of isotope $^{10}B$ (or $^{11}B$) to a total number of moles of $^{10}B$ and $^{11}B$.

Boron in its natural state may have two stable isotopes, the two stable isotopes may be $^{10}B$ and $^{11}B$, and a ratio of $^{10}B$ may be 19.8% and a ratio of $^{11}B$ is 80.2%.

$^{10}B$ may be one of elements having the largest absorption cross-section among the elements listed in the periodic table. Here, the absorption cross-section may indicate a cross-sectional area for neutron absorption, and the larger the absorption cross-section, the higher a possibility of the neutron absorption. The absorption cross-section of $^{10}B$ may be 3835 barn (1 barn=$10^{-24}$ cm$^2$), and the absorption cross-section of $^{11}B$ may be 0.0055 barn, and $^{10}B$ may have the absorption cross-section significantly larger than that of $^{11}B$.

The body 110, whose main material is ceramic, may have higher durability against the neutron, whereas each of the external electrode 131 or 132 and the internal electrode 121 or 122, whose main material is a metal rather than the ceramic, may have lower durability against the neutron compared to the body 110. The internal electrode 121 or 122 may be protected by the dielectric layer 111 or the external electrode 131 or 132 even though having the lower durability against the neutron.

Therefore, according to an exemplary embodiment of the present disclosure, the ceramic electronic component 100 may have significantly increased neutron absorption efficiency by allowing boron to be included in the external electrode 131 or 132, which has the lower durability against the neutron compared to the body 110, and controlling the ratio of $^{10}B$ in boron to be higher than that in the natural state.

Hereinafter, the description describes each component included in the ceramic electronic component 100 according to an exemplary embodiment of the present disclosure.

The body 110 may include the dielectric layer 111 and the internal electrodes 121 and 122, which are alternately stacked on each other.

The body 110 is not limited to a particular shape, and may have a hexahedral shape or a shape similar to the hexahedral shape, as shown in the drawings. The body 110 may not have the hexahedral shape having perfectly straight lines due to contraction of ceramic powders included in the body 110 in a sintering process, and have substantially the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

As marginal regions where the internal electrodes 121 and 122 are not positioned may overlap each other on the dielectric layer 111, and a step difference may thus occur due to thicknesses of the internal electrodes 121 and 122. Accordingly, corners connecting the first surface and the third through fifth surfaces or corners connecting the second surface and the third through the fifth surface may be contracted toward the center of the body 110 in the first direction, based on the first surface or the second surface. Alternatively, due to a contraction behavior in the sintering process of the body, corners connecting the first surface 1 and the third through sixth surfaces 3, 4, 5 and 6 to each other or corners connecting the second surface 2 and the third through the sixth surfaces 3, 4, 5 and 6 to each other may be contracted toward the center of the body 110 in the first direction, based on the first surface or the second surface. Alternatively, a separate process may be performed to round the corners connecting respective surfaces of the body 110 to each other in order to prevent a chipping defect or the like, and the corners connecting the first and third through surfaces to each other or the corners connecting the second surface and the third through sixth surfaces to each other may thus each have a round shape.

Meanwhile, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may then be stacked on both side surfaces of a capacitance formation part Ac in the third direction (or width direction) to form marginal parts 114 and 115. In this case, portions connecting the first surface and the fifth or sixth surface to each other and portions connecting the second surface and the fifth or sixth surface to each other may not be contracted.

The plurality of dielectric layers 111 included in the body 110 may be in a sintered state, and adjacent dielectric layers 111 may be integrated with each other so that boundaries therebetween are not readily apparent without using a scanning electron microscope (SEM). The number of stacked dielectric layers does not need to be particularly limited, and may be determined by considering a size of the ceramic electronic component. For example, the body may be formed by stacking 400 or more dielectric layers on each other.

The dielectric layer 111 may be formed by preparing a ceramic slurry including ceramic powders, an organic solvent and a binder, applying the slurry on a carrier film and drying the same to prepare a ceramic green sheet, and then sintering the ceramic green sheet. The ceramic powders are not particularly limited as long as the powers may obtain sufficient capacitance, and may use, for example, barium titanate-based (BaTiO$_3$)-based powders. The ceramic powders may be, for example, at least one of BaTiO$_3$ or (Ba$_{1-x}$Ca$_x$)TiO$_3$ (0<x<1), Ba(Ti$_{1-y}$Ca$_y$)O$_3$ (0<y<1), (Ba$_{1-x}$Ca$_x$)(Ti$_{1-y}$Zr$_y$)O$_3$ (0<x<1, 0<y<1), or Ba(Ti$_{1-y}$Zr$_y$)O$_3$ (0<y<1).

An average thickness td of the dielectric layer 111 is not particularly limited, and may be, for example, 10 µm or less. In addition, the average thickness td of the dielectric layer 111 may be arbitrarily set based on its desired characteristic or usage. In addition, 0.4 µm or less may be the average thickness td of the dielectric layer 111 to facilitate the manufacturing of ceramic electronic components having a smaller size and higher capacitance.

Here, the average thickness td of the dielectric layer 111 may indicate a size of the dielectric layer 111 positioned between the internal electrodes 121 and 122 in the first direction. The average thickness of the dielectric layer 111 may be measured by scanning cross sections of the body 110 in the first and second directions by using the scanning electron microscope with a magnification of 10,000. In more detail, an average thickness value of the dielectric layer 111 may be obtained by averaging the thicknesses of one dielectric layer measured at a plurality of points, for example, at thirty equally spaced points in the second direction. The thirty equally spaced points may be designated in the capacitance formation part Ac to be described below. In addition, it is possible to obtain a more general average thickness of the dielectric layer 111 when measuring its average value by extending a measurement target of the average value to ten dielectric layers 111.

The body 110 may further include the capacitance formation part Ac positioned in the body 110, and forming capacitance of the ceramic electronic component by including the first and second internal electrodes 121 and 122 positioned to oppose each other while having the dielectric layer 111 interposed therebetween, and include cover parts 112 and 113 positioned on the upper and lower surfaces of the capacitance formation part Ac in the first direction.

In addition, the capacitance formation part Ac may be a part that contributes to forming the capacitance of the capacitor, and formed by repeatedly stacking the plurality of first and second internal electrodes 121 and 122 on each other while having the dielectric layer 111 interposed therebetween.

The cover parts 112 and 113 may include the upper cover part 112 positioned on an upper surface of the capacitance formation part Ac in the first direction and the lower cover part 113 positioned on a lower surface of the capacitance formation part Ac in the first direction.

The upper cover part 112 and the lower cover part 113 may respectively be formed by stacking one dielectric layer or two or more dielectric layers on the upper and lower surfaces of the capacitance formation part Ac in the thickness direction, and may basically prevent the internal electrodes from being damaged due to physical or chemical stress.

The upper or lower cover part 112 or 113 may include no internal electrode, and may include the same material as the dielectric layer 111.

That is, the upper or lower cover part 112 or 113 may include the ceramic material such as a barium titanate ($BaTiO_3$)-based ceramic material.

Meanwhile, a thickness of the cover part 112 or 113 may not need to be particularly limited. However, 15 μm or less may be an average thickness tc of the cover part 112 or 113 to facilitate the manufacturing of ceramic electronic component having a smaller size and a higher capacitance.

The average thickness tc of the cover part 112 or 113 may indicate its size in the first direction, and may have a value obtained by averaging the sizes of the cover part 112 or 113 in the first direction, measured at five equally spaced points on upper or lower surface of the capacitance formation part Ac.

In addition, marginal part 114 or 115 may be positioned on each side surface of the capacitance formation part Ac.

The marginal part 114 or 115 may be the first marginal part 114 positioned on the fifth surface 5 of the body 110 or the second marginal part 115 positioned on the sixth surface 6 of the body 110. That is, the marginal part 114 or 115 may be positioned on each of two end surfaces of the body 110 in the width direction.

As shown in FIG. 3, the marginal part 114 or 115 may indicate a region between an end of the first or second internal electrode 121 or 122 and a boundary surface of the body 110, based on cross sections of the body 110 cut in the width and thickness (W-T) directions.

The marginal part 114 or 115 may basically prevent the internal electrode from being the damaged due to the physical or chemical stress.

The marginal part 114 or 115 may be formed by forming the internal electrode by applying a conductive paste on the ceramic green sheet except its portion where the marginal part is to be positioned.

Alternatively, in order to suppress the step difference occurring due to the internal electrodes 121 and 122, the marginal part 114 or 115 may be formed by stacking the internal electrodes on each other, then cutting the internal electrodes to be exposed to the fifth and sixth surfaces 5 and 6 of the body, and then stacking one dielectric layer or two or more dielectric layers on each side surface of the capacitance formation part Ac in the third direction (or width direction).

Meanwhile, an average width of the marginal part 114 or 115 may not need to be particularly limited. However, 15 μm or less may be the average width of the marginal part 114 or 115 to facilitate the manufacturing of the ceramic electronic component having a smaller size and a higher capacitance.

The average width of the marginal part 114 or 115 may be an average size MW1 of an area where the internal electrode is spaced apart from the fifth surface in the third direction or an average size MW2 of an area where the internal electrode is spaced apart from the sixth surface in the third direction, and may be an average value of a size of the marginal part 114 or 115 in the third direction, measured at five equally spaced points on the side surface of the capacitance formation part Ac.

Accordingly, in an exemplary embodiment, 15 μm or less may be the average size MW1 or MW2 of the region where the internal electrode 121 or 122 is spaced apart from the fifth or sixth surface in the third direction.

The internal electrode 121 or 122 may be the first internal electrode 121 or the second internal electrode 122. The first and second internal electrodes 121 and 122 may be alternately positioned to oppose each other interposing the dielectric layer 111 included in the body 110 therebetween, and may respectively be exposed to the third and fourth surfaces 3 and 4 of the body 110.

The first internal electrode 121 may be spaced apart from the fourth surface 4 and exposed to the third surface 3, and the second internal electrode 122 may be spaced apart from the third surface 3 and exposed to the fourth surface 4. The first external electrode 131 may be positioned on the third surface 3 of the body to be connected to the first internal electrode 121, and the second external electrode 132 may be positioned on the fourth surface 4 of the body to be connected to the second internal electrode 122.

That is, the first internal electrode 121 may not be connected to the second external electrode 132 and connected to the first external electrode 131, and the second internal electrode 122 may not be connected to the first external electrode 131 and connected to the second external electrode 132. Accordingly, the first internal electrode 121 may be spaced apart from the fourth surface 4 by a predetermined distance, and the second internal electrode 122 may be spaced apart from the third surface 3 by the predetermined distance. In addition, the first or second internal electrode 121 or 122 may be positioned to be spaced apart from the fifth or sixth surface of the body 110.

A conductive metal included in the internal electrode 121 or 122 may be at least one of nickel (Ni), copper (Cu), palladium (Pd), silver (Ag), gold (Au), platinum (Pt), indium (In), tin (Sn), aluminum (Al), titanium (Ti), and an alloy thereof, and the present disclosure is not limited thereto.

A method of forming the internal electrode 121 or 122 is not particularly limited. For example, the internal electrode 121 or 122 may be formed by applying the conductive paste for an internal electrode including the conductive metal on the ceramic green sheet and firing the same. A method of applying the conductive paste for an internal electrode may be a screen printing method, a gravure printing method or the like, and the present disclosure is not limited thereto.

For another example, the internal electrode 121 or 122 may be formed using a sputtering method, a vacuum deposition method, or a chemical vapor deposition method.

An average thickness te of the internal electrode does not need to be particularly limited. Here, a thickness of the internal electrode 121 or 122 may indicate a size of the internal electrode 121 or 122 in the first direction. For example, 0.4 µm or less may be the average thickness te of the internal electrode 121 or 122 to facilitate the manufacturing of the ceramic electronic component having a smaller size and a higher capacitance.

Here, the average thickness te of the internal electrode 121 or 122 may be measured by scanning the cross sections of the body 110 in the first and second directions by using the scanning electron microscope with the magnification of 10,000. In more detail, an average thickness value of the internal electrode 121 or 122 may be obtained by averaging the thicknesses of one internal electrode measured at a plurality of points, for example, at thirty equally spaced points in the second direction. The thirty equally spaced points may be designated in the capacitance formation part Ac. In addition, it is possible to obtain a more general average thickness of the internal electrode 121 or 122 when measuring its average value by extending a measurement target of the average value to ten internal electrode 121 or 122.

The external electrode 131 or 132 may include boron, and the ratio of $^{10}B$ in boron may be 20% or more.

As described above, the body 110, whose main material is ceramic, may have the higher durability against the neutron, whereas each of the external electrode 131 or 132 and the internal electrode 121 or 122, whose main material is a metal rather than the ceramic, may have the lower durability against the neutron compared to the body 110. The internal electrode 121 or 122 may be protected by the dielectric layer 111 or the external electrode 131 or 132 even though having the lower durability against the neutron.

Therefore, according to an exemplary embodiment of the present disclosure, the ceramic electronic component 100 may effectively increase its neutron absorption power by allowing boron to be included in the external electrode 131 or 132, which has the lower durability against the neutron compared to the body 110, and controlling the ratio of $^{10}B$ in boron to 20% or more.

The external electrode 131 or 132 may be positioned on the third surface 3 or fourth surface 4 of the body 110.

The external electrode 131 or 132 may be the first or second external electrode 131 or 132 positioned on the third or fourth surface 3 or 4 of the body 110, and connected to the first or second internal electrode 121 or 122.

Referring to FIG. 1, the external electrode 131 or 132 may cover a surface of an end portion of the side marginal part 114 or 115 in the second direction.

This exemplary embodiment describes that the ceramic electronic component 100 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity such as the metal, may use a specific material determined in consideration of its electrical characteristic, structural stability or the like, and may have a multilayer structure.

For example, the external electrode 131 or 132 may include an electrode layer 131a or 132a positioned on the body 110 and a plating layer 131b or 132b formed on the electrode layer 131a or 132a.

For a more specific example of the electrode layer 131a or 132a, the electrode layer 131a or 132a may be a fired electrode including the conductive metal and glass, or a resin-based electrode including the conductive metal and resin.

In addition, the electrode layer 131a or 132a may be formed by sequentially positioning the fired electrode and the resin-based electrode on the body. In addition, the electrode layer 131a or 132a may be formed by transferring a sheet including the conductive metal to the body or by transferring the sheet including the conductive metal to the fired electrode.

The conductive metal included in the electrode layer 131a or 132a may use the material having the excellent electrical conductivity, and is not particularly limited. For example, the conductive metal may be at least one of nickel (Ni), copper (Cu), and an alloy thereof.

In an exemplary embodiment, the external electrode 131 or 132 may include glass G, and boron may be included in the glass G. Referring to FIG. 5, the external electrode 131 or 132 may include the electrode layer 131a or 132a including the glass G and a conductive metal M and connected to the internal electrode 121 or 122, and boron may be included in the glass G.

It is necessary that the external electrode 131 or 132 ensures its sufficient electrical connection with the internal electrode 121 or 122, and is physically bonded to the body with sufficient strength. To this end, the external electrode may be generally formed by applying and firing a paste including the conductive metal and glass. The glass G may improve a coupling strength between the body 110 and the external electrode 131 or 132, and the conductive metal M may electrically connect the external electrode 131 or 132 with the internal electrode 121 or 122.

In addition, the glass G included in the external electrode may generally include boron for glass phase stability. Therefore, when the glass G includes boron in which the ratio of $^{10}B$ is 20% or more, a separate composition design change may not be required, thus more efficiently improving the durability of the ceramic electronic component against the neutron.

Boron included in the glass G may be included in the form of an oxide, specifically in the form of boric oxide ($B_2O_3$). A content of boron included in the glass does not need to be particularly limited, and boron may be included in an amount set for another characteristic of a corresponding product. For example, the glass may be added in an amount of 1 wt % or more and 8 wt % relative to the paste for an external electrode, and boron may be included in an amount of 5 mol % or more and 50 mol % or less relative to the glass.

However, it is to be noted that boron does not necessarily have to be included in the glass or in the form of $B_2O_3$. For example, boron may be included in the external electrode 131 or 132 in the form of boron carbide or boron nitride in addition to the form of $B_2O_3$. In addition, boron may be included in a conductive resin layer including the conductive metal and the resin, or may be included in the plating layer 131b or 132b.

Meanwhile, a method for controlling the ratio of isotope $^{10}B$ in boron is not particularly limited. For example, the method for controlling the ratio of isotope $^{10}B$ may include a method of increasing the ratio of isotope $^{10}B$ in boron halide by a known chemical exchange method. The ratio of $^{10}B$ may be adjusted by a reaction distillation tower in which an ether complex of boron trifluoride ($BF_3$) and anisole ($C_6H_5OCH_3$) is formed, and a chemical exchange reaction ($^{10}BF_3 + ^{11}BF_3 \cdot C_6H_5OCH_3 \Leftrightarrow ^{11}BF_3 + ^{10}BF_3 \cdot C_6H_5OCH_3$) between the formed ether complex and BF3 and distillation are then combined with each other. In this way, a boron compound may have a desired form by adjusting the ratio of $^{10}B$, and then be included in the external electrode 131 or 132.

In addition, a method for determining the ratio of isotope $^{10}B$ in boron may be any known method, and is not particularly limited. For example, when boron is included in the glass G, the ratio of $^{11}B$ and the ratio of $^{10}B$ may be obtained by polishing the external electrode to separate the boron compound from the glass, and then distinguishing $^{10}B$ and $^{11}B$ in the boron compound from each other. Known methods for distinguishing $^{10}B$ and $^{11}B$ from each other may include inductively coupled plasma optical emission spectroscopy (ICP-OES) and inductively coupled plasma mass spectrometry (ICP-MS) methods that measure a mass difference of two isotopes by using plasma or positive thermal ionization mass spectrometry (PTIMS) and negative thermal ion mass spectrometry (NTIMS) methods that measure their mass difference by using a magnetic force, and non-mass measurement methods such as spectrophotometry and neutron analysis. The most widely used inductively coupled plasma mass spectrometry (ICP-MS) method (or multicollector inductively coupled plasma mass spectrometer (MC-ICP-MS) method) shows high accuracy by analyzing a difference in a mass-to-charge ratio (m/z) of boron ionized by plasma to thus analyze an element in nanogram units even using a small amount of sample in milligram units. In general, boron may be dissolved in a nitric acid solution diluted 1 to 100, and then measured 5 times using a sample having a size of 1 mL, this solution of 1 mL is required to include at least 0.01 nanograms of boron, and the measurement method is not limited thereto.

In an exemplary embodiment, the ratio of isotope $^{10}B$ in boron may be 25% or more and 85% or less.

When considering the glass G included in the external electrode 131 or 132 and a general content of boron included in the glass G, the neutron moved in a straight line toward the internal electrode may encounter four or more boron crystals from the outside to reach the body 110 through the external electrode 131 or 132. Therefore, when the ratio of isotope $^{10}B$ in boron is 25% or more, it is possible to stably capture the neutron, thereby improving the durability of the ceramic electronic component against the neutron.

Meanwhile, referring to Equation 1 below, when absorbing a neutron $^1n$, $^{10}B$ may become $^{11}B$, or may be converted into an alpha ray and lithium (Li) or a gamma ray and lithium (Li).

[Equation 1]

$$^1n + {}^{10}B \longrightarrow [{}^{11}B] \longrightarrow {}^7Li + {}^4He + 2.79 \text{ MeV}$$

$$^1n + {}^{10}B \longrightarrow [{}^{11}B] \begin{cases} {}^7Li + {}^4He + 2.31 \text{ MeV} \\ {}^7Li + \gamma + 0.48 \text{ MeV} \end{cases}$$

Boron combined with the neutron may be converted into lithium, and when the ratio of $^{10}B$ is more than 85%, boron included in the glass may be lost in a case where excessive neutrons are irradiated to thus lower the glass phase stability, thereby causing devitrification. Here, the devitrification may indicate a phenomenon in which crystals are precipitated from glass.

Therefore, when the ratio of isotope $^{10}B$ in boron included in the glass is controlled to 25% or more and 85% or less, it is possible to further improve the durability against the neutron and maintain the glass phase stability.

The plating layer 131b or 132b may improve a mount characteristic of the ceramic electronic component. The plating layer 131b or 132b is not limited to a particular type, may include at least one of nickel (Ni), tin (Sn), palladium (Pd), and an alloy thereof, or may include a plurality of layers.

For a more specific example of the plating layer 131b or 132b, the plating layer 131b or 132b may be a nickel (Ni) plating layer or a tin (Sn) plating layer, may have the nickel (Ni) plating layer and the tin (Sn) plating layer, sequentially formed on the electrode layer 131a or 132a, or the tin (Sn) plating layer, the nickel (Ni) plating layer, and the tin (Sn) plating layer, sequentially formed on the electrode layer. In addition, the plating layer 131b or 132b may include the plurality of nickel (Ni) plating layers or the plurality of tin (Sn) plating layers.

Figure 6:
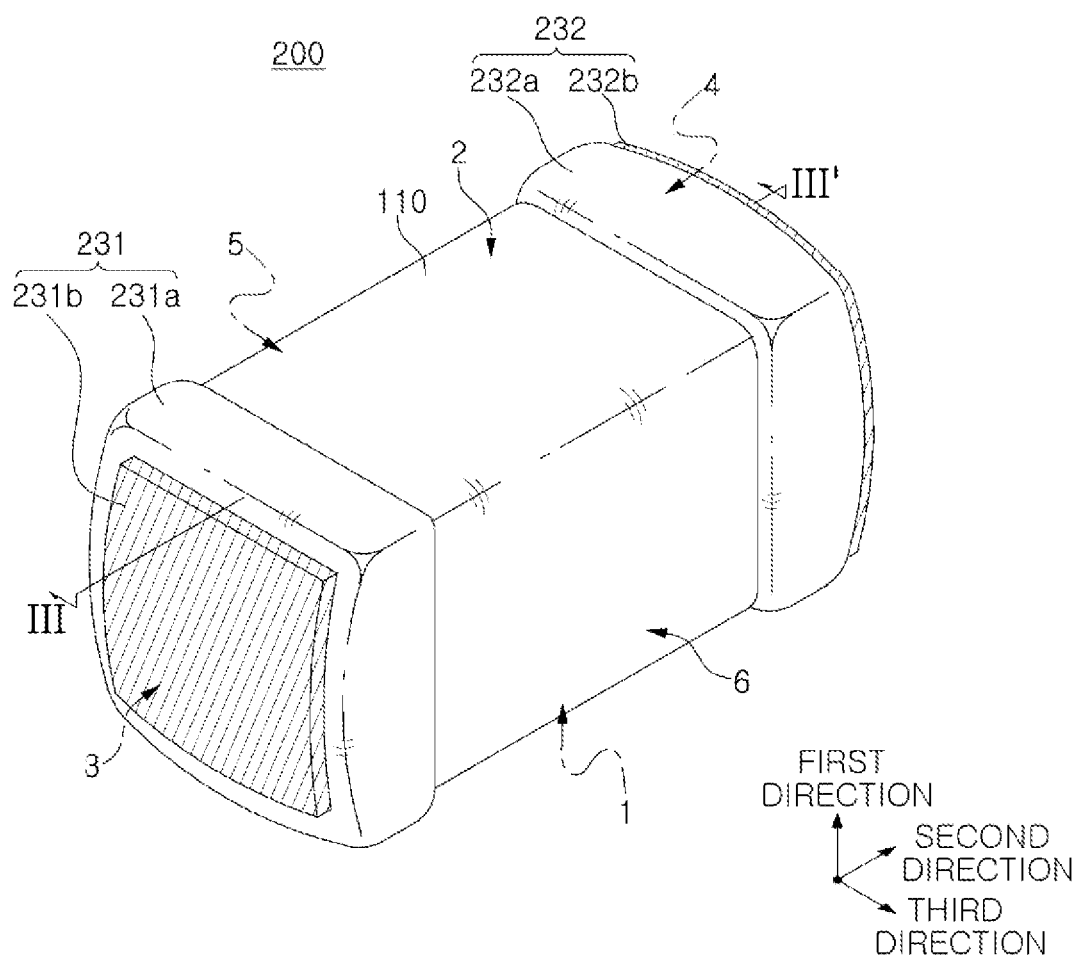
FIG. 6 is a perspective view schematically showing a ceramic electronic component according to another exemplary embodiment of the present disclosure.

FIG. 6 is a perspective view schematically showing a ceramic electronic component according to another exemplary embodiment of the present disclosure.

Figure 7:
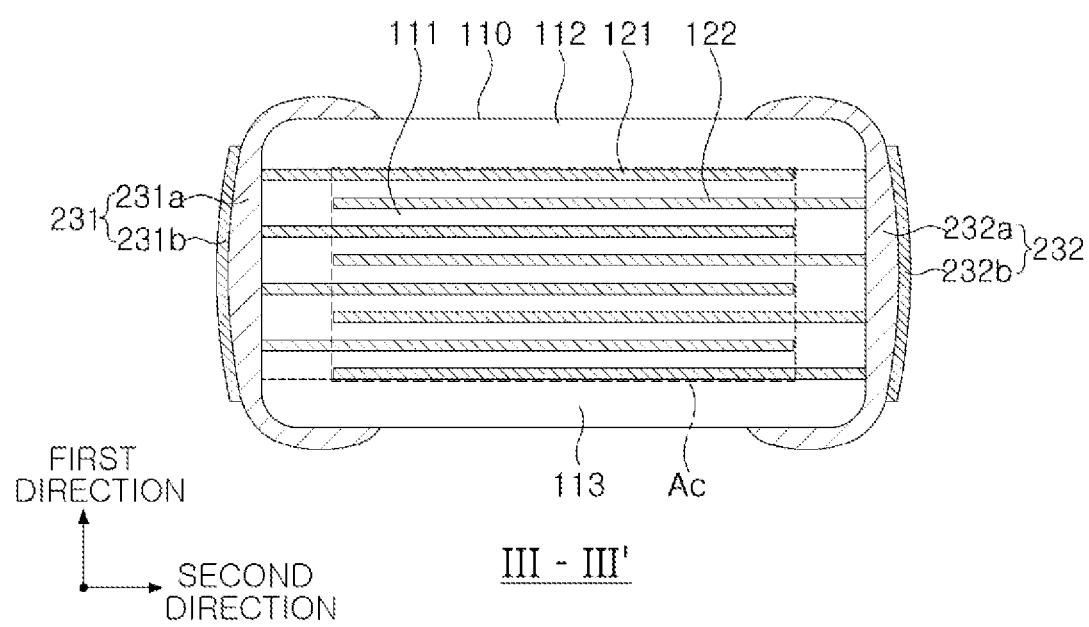
FIG. 7 is a schematic cross-sectional view taken along line III-III' in FIG. 6.

FIG. 7 is a schematic cross-sectional view taken along line III-III' of FIG. 6.

Hereinafter, the ceramic electronic component 200 according to another exemplary embodiment of the present disclosure is described with reference to FIGS. 6 and 7. However, the description omits a description for contents overlapping the contents described above.

In the ceramic electronic component 200 according to another exemplary embodiment of the present disclosure, an external electrode 231 or 232 may include an electrode layer 231a or 232a connected to the internal electrode 121 or 122 and a cover layer 231b or 232b positioned on the electrode layer, and boron in which the ratio of isotope $^{10}B$ is 20% or more may be included in the cover layer 231b or 232b.

The electrode layer 231a or 232a may ensure electrical connection with the internal electrode 121 or 122, and the cover layer 231b or 232b may be positioned on the electrode layer 231a or 232a to protect the electrode layer 231a or 232a from a neutron.

The cover layer 231b or 232b may include a conductive metal, and may cover the entire electrode layer 231a or 232a.

However, the electrode layer 231a or 232a may ensure the electrical connection with the internal electrode 121 or 122, the cover layer 231b or 232b may include no conductive metal.

That is, the cover layer 231b or 232b may include no conductive metal. In this case, as shown in FIGS. 6 and 7, the cover layer may not cover at least a portion of the electrode layer 231a or 232a to ensure the electrical connection between a mounting board and the internal electrode 121 or 122. Here, a plating layer may be positioned on an area where the cover layer 231b or 232b is not positioned on the electrode layer 231a or 232a.

In addition, the cover layer 231b or 232b may include glass, and boron may be included in the glass.

In another exemplary embodiment, the ratio of isotope $^{10}B$ in boron may be 90% or more.

The electrode layer 231a or 232a may ensure the electrical connection with the internal electrode 121 or 122, and accordingly, even when $^{10}B$ included in the cover layer 231b or 232b absorbs the neutron and is converted to lithium (Li), its influence on performance of ceramic electronic component may be limited. Therefore, it is possible to further improve durability of the ceramic electronic component against the neutron by setting the ratio of $^{10}B$ in boron included in the electrode layer 231a or 232a to 90% or more.

As set forth above, according to the present disclosure, it is possible to improve the durability of the ceramic electronic component against the radiation by controlling the ratio of isotope $^{10}B$ in boron included in the external electrode.

According to the present disclosure, it is also possible to suppress the capacitance of the ceramic electronic component from being lower by the radiation.

According to the present disclosure, it is also possible to suppress the current induced into the ceramic electronic component by the radiation.

While the exemplary embodiments have been shown and described above, it will be apparent to those skilled in the art that modifications and variations could be made without departing from the scope of the present disclosure as defined by the appended claims.

What is claimed is:

1. A ceramic electronic component comprising:
   a body including a dielectric layer and internal electrodes; and
   an external electrode disposed on the body and including boron,
   wherein a ratio of isotope $^{10}B$ in the boron is 25% or more.

2. The component of claim 1, wherein the external electrode includes glass, and the boron is included in the glass.

3. The component of claim 1, wherein the external electrode is connected to at least one of the internal electrodes and includes an electrode layer including glass and a conductive metal, and
   the boron is included in the glass.

4. The component of claim 3, wherein the boron is included in the form of boric oxide ($B_2O_3$).

5. The component of claim 3, wherein the ratio of the isotope $^{10}B$ in the boron is 85% or less.

6. The component of claim 1, wherein the external electrode includes a conductive resin layer including a conductive metal and resin, and
   the boron is included in the conductive resin layer.

7. The component of claim 1, wherein the external electrode includes a plating layer, and
   the boron is included in the plating layer.

8. The component of claim 1, wherein the external electrode includes an electrode layer connected to at least one of the internal electrodes and a cover layer positioned on the electrode layer, and
   the boron is included in the cover layer.

9. The component of claim 8, wherein the cover layer includes a conductive metal, and covers the entire electrode layer.

10. The component of claim 8, wherein the cover layer is free of conductive metal, and does not cover at least a portion of the electrode layer.

11. The component of claim 8, wherein the ratio of the isotope $^{10}B$ in the boron is 90% or more.

12. The component of claim 8, wherein the cover layer includes glass, and the boron is included in the glass.

13. A ceramic electronic component comprising:
    a body including a dielectric layer and internal electrodes; and
    an external electrode disposed on the body and including boron,
    wherein a ratio of isotope $^{10}B$ in the boron is 25% or more and 85% or less.

14. The component of claim 13, wherein the external electrode includes glass including the boron.

15. The component of claim 13, wherein the boron is included in the form of boric oxide ($B_2O_3$).

16. The component of claim 13, wherein the external electrode includes a conductive resin layer including a conductive metal and resin including the boron.

* * * * *